April 18, 1933. H. SCHNYDER 1,903,882
SHAVING CUP
Filed March 14, 1932

Inventor:
Hans Schnyder,
By Sommers & Young,
Attys.

Patented Apr. 18, 1933

1,903,882

UNITED STATES PATENT OFFICE

HANS SCHNYDER, OF BIEL, SWITZERLAND

SHAVING CUP

Application filed March 14, 1932, Serial No. 598,799, and in Switzerland March 27, 1931.

This invention relates to shaving cups wherein by relatively shifting a foot member and a cup member of the cup a substance for producing shaving lather therefrom is expelled through a passage from an interior hollow space into the cup member.

According to the invention a convenient and pleasing shape for a shaving cup of this type is provided for by forming the foot member of the cup in the manner of a goblet with an upper dish-shaped portion. With this construction, the dish-shaped portion of the foot member and the cup member of the cup, between which parts the means for shifting these members relatively to each other are arranged, confine a hollow space for receiving the substance for producing shaving lather therefrom.

This design for the shaving cup permits of disposing the passage for the substance from which the shaving lather is obtained laterally of the dish, so that liquid matter collecting at the bottom of the dish during the squirting of said substance is prevented from penetrating into the interior hollow space and mixing with the substance stored therein, which is particularly desirable when a liquid or creamy substance is involved.

Figure 1:
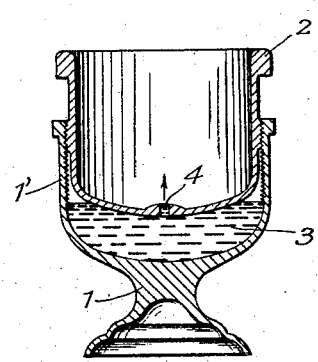
Figure 2:
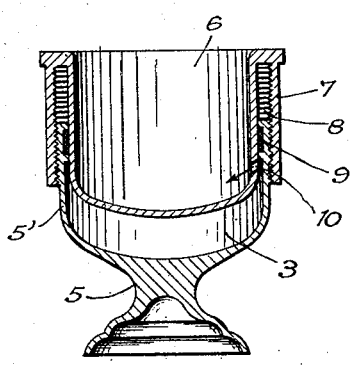
Figure 3:
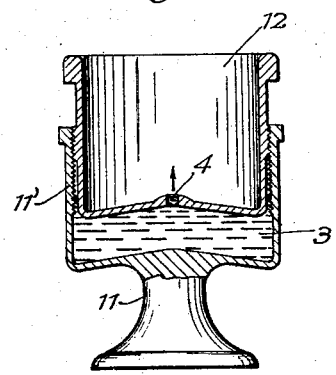

In the accompanying drawing several constructional forms of the invention are shown by way of example only in the Figs. 1 to 3 in three different sectional elevations.

With the constructional example shown in Fig. 1, the foot member 1 is designed as a goblet with an upper dish-shaped portion 1' and the cup-member as a dish 2, and the members 1' and 2 are screw-threadedly connected, so that in screwing said members into each other portions of a substance 3 in the form of a creamy paste for producing shaving lather therefrom are forced from the hollow space enclosed between the upper portion 1' of the foot member 1 and the dish 2 through the passage 4 in the dish 2 in the direction of the arrow. About the passage 4 the bottom of the dish is raised to form an elevation for preventing liquid matter gathering on the bottom of the dish 2 from penetrating through the passage to the substance stored in the hollow space.

In the second constructional form of the invention, as shown in Fig. 2, the dish 6 is formed with a cylindric double side wall 7 enclosing an annular space 8 open at its lower end and the foot member which is again in the form of a goblet 5 with an upper dish-shaped portion 5' is threadedly connected to the outer portion of the side wall 7. On the inner circumference of the side wall of the dish-shaped portion 5' of the foot member 5 a packing strip 9 is inserted in a recess of said wall so as to bear against the inner portion of the side wall 7 of the dish 6, thus sealing the hollow space, between the foot member 5 and the dish-shaped cup member 6 of the shaving cup. With this arrangement the paste 3 for producing shaving lather therefrom is prevented from contacting with portions of the thread and destruction of the thread by erosion due to reaction with the paste avoided. The passage 10 for conducting the paste or substance 3 for producing shaving lather into the dish 6 is disposed in the side wall of the same, thus enabling a liquid or creamy substance to be used for this purpose which in screwing the members 5 and 6 together flows through the passage 10 in the direction of the arrow in the dish 6 for being squirted therein until the shaving lather is formed. Alternatively, when a thicker paste is intended to be used with this constructional example, the passage for the paste may be centrally disposed in the bottom of the dish 6, thus enabling to prevent the paste from hardening by keeping the bottom covered by a small amount of water.

The third constructional example of the invention, as shown in Fig. 3, is distinct from the example illustrated in Fig. 1 by the bottom of the upper portion 11' of the foot member 11 and the bottom of the cup-shaped portion 12 of the shaving cup being upwardly curved towards the middle. This arrangement in connection with the elevation formed in the middle of the bottom of the dish 12 round the passage 4 permits of preventing liquid matter from entering the hollow space between the parts 11' and 12, thus enabling again a liquid substance for producing shaving lather therefrom being used, which by screwing said parts together flows from the hollow space into the dish 12 in the direction of the arrow.

I claim:

1. In a shaving cup of the type described, in combination a foot member in the form of a goblet, an upper dish-shaped portion provided on said foot member, a cup member in the form of a dish and adapted to confine together with said dish-shaped portion a hollow space for a substance for producing shaving lather therefrom, a passage disposed in the side wall of said cup member in spaced relation to the bottom of said cup for leading liquid substance from said dish-shaped portion of said foot member to said cup member, and a screw thread engagement arranged between said foot member and said cup member and adapting the members to be approached on each other for forcing the substance from said hollow space into said cup member.

2. In a shaving cup of the type described, in combination, a foot member in the form of a goblet, an upper dish-shaped portion provided on said foot member, an exterior circumferential thread portion formed in said dish-shaped portion, a cup member in the form of a dish and adapted to confine together with said dish-shaped portion a hollow space for a substance for producing shaving lather therefrom, a cylindric double side wall for said cup member, an interior thread portion provided on the outer portion of said cylindric side wall and meshing with said exterior circumferential thread portion of said dish-shaped portion, sealing means inserted between the inner circumference of said dish-shaped portion and the outer circumference of said inner portion of said cylindric side wall of said cup member, and a passage for said substance for leading the same from said dish-shaped portion of said foot member into said cup member when said foot member and said cup member are approached on each other by means of said interengaging thread portions.

3. In a shaving cup of the type described, in combination, a foot member in the form of a goblet, an upper dish-shaped portion provided on said foot member, an exterior circumferenetial thread portion formed in said dish-shaped portion, a cup member in the form of a dish and adapted to confine together with said dish-shaped portion a hollow space for a substance for producing shaving lather therefrom, a cylindric double side wall for said cup member, an interior thread portion provided on the outer portion of said cylindric side wall and meshing with said exterior circumferential thread portion of said dish-shaped portion, sealing means inserted between the inner circumference of said dish-shaped portion and the outer circumference of said inner portion of said cylindric side wall of said cup member, and a passage disposed in the side wall of said cup member in spaced relation to the bottom of said cup for leading liquid substance from said dish-shaped portion of said foot member into said cup member when said foot member and said cup member are approached on each other by means of said interengaging thread portions.

4. In a shaving cup in combination, a foot member, an upper dish-shaped portion provided on said foot member, a cup member in the form of a dish and adapted to confine together with said dish-shaped portion a hollow space for a substance for producing shaving lather, said cup member having a passage in its side wall in spaced relation to the bottom of said cup for leading said substance from said dish-shaped portion of said foot member to said cup member, eased off portions of the sides of said passage providing an exit of least resistance for said substance for facilitating the extrusion of the same, and a screw thread engagement arranged between said foot member and said cup member and adapting the members to be approached on each other for forcing the substance from said hollow space through said passage into said cup member at a minimum of pressure.

In testimony whereof, I have signed my name to this specification.

HANS SCHNYDER.